United States Patent
Xu et al.

(10) Patent No.: US 10,527,431 B2
(45) Date of Patent: *Jan. 7, 2020

(54) INTERACTIVE VENUE ASSISTANT

(71) Applicant: eBay Inc., San Jose, CA (US)

(72) Inventors: Dong Xu, Shanghai (CN); Frédéric Tu, Shanghai (CN); Meijie Xia, Wuhan (CN)

(73) Assignee: EBAY INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/895,911

(22) Filed: Feb. 13, 2018

(65) Prior Publication Data

US 2018/0172452 A1 Jun. 21, 2018

Related U.S. Application Data

(63) Continuation of application No. 14/997,421, filed on Jan. 15, 2016, now Pat. No. 9,891,056, which is a (Continued)

(51) Int. Cl.
| | |
|---|---|
| *G01C 21/20* | (2006.01) |
| *G06Q 10/02* | (2012.01) |
| *G01C 21/36* | (2006.01) |
| *H04W 4/21* | (2018.01) |
| *H04W 4/024* | (2018.01) |
| *H04W 4/029* | (2018.01) |

(Continued)

(52) U.S. Cl.
CPC ....... *G01C 21/206* (2013.01); *G01C 21/3617* (2013.01); *G01C 21/3679* (2013.01); *G06Q 10/02* (2013.01); *G06Q 30/0631* (2013.01); *H04W 4/023* (2013.01); *H04W 4/024* (2018.02); *H04W 4/029* (2018.02); *H04W 4/21* (2018.02)

(58) Field of Classification Search
CPC .. G01C 21/206; G01C 21/00; G01C 21/3617; G01C 21/3679; H04W 4/21; H04W 4/02; H04W 4/023; G06Q 10/02; G06Q 30/0631; G08G 1/096844
USPC ........................................................ 701/408
See application file for complete search history.

(56) References Cited

U.S. PATENT DOCUMENTS

| | | | |
|---|---|---|---|
| 9,310,205 B2 | 4/2016 | Xu et al. | |
| 9,891,056 B2 * | 2/2018 | Xu | ............... H04W 4/21 |

(Continued)

FOREIGN PATENT DOCUMENTS

WO   2015126509 A1   8/2015

OTHER PUBLICATIONS

Non-Final Office Action received for U.S. Appl. No. 14/185,772, dated Dec. 29, 2014, 10 pgs.
(Continued)

*Primary Examiner* — Gertrude Arthur Jeanglaude
(74) *Attorney, Agent, or Firm* — Maschoff Brennan

(57) ABSTRACT

Methods and systems for assisting a user at an event and venue are described. A user is guided or navigated to different points of interest at a venue. The points of interest include seat locations or surrounding services and facilities, such as restaurants, shops, and restrooms. Advertisements and promotions associated with surrounding services may be displayed to the user. The user may be notified of the presence of friends and family at the same venue, and be provided with real-time information about the event.

20 Claims, 3 Drawing Sheets

Related U.S. Application Data continuation of application No. 14/185,772, filed on Feb. 20, 2014, now Pat. No. 9,310,205.

(51) Int. Cl.
*H04W 4/02* (2018.01)
*G06Q 30/06* (2012.01)

(56) References Cited

U.S. PATENT DOCUMENTS

| | | |
|---|---|---|
| 2008/0132251 A1 | 6/2008 | Altman et al. |
| 2009/0319306 A1 | 12/2009 | Chanick |
| 2010/0082374 A1 | 4/2010 | Charania et al. |
| 2010/0157848 A1 | 6/2010 | Das et al. |
| 2011/0029670 A1 | 2/2011 | Klein et al. |
| 2011/0106436 A1 | 5/2011 | Bill |
| 2012/0078667 A1 | 3/2012 | Denker et al. |
| 2013/0124234 A1 | 5/2013 | Nilsson et al. |
| 2015/0233715 A1 | 8/2015 | Xu et al. |
| 2016/0131487 A1 | 5/2016 | Xu et al. |

OTHER PUBLICATIONS

Response to Non-Final Office Action filed Mar. 27, 2015 for U.S. Appl. No. 14/185,772, dated Dec. 29, 2014, 13 pgs.
Final Office Action received for U.S. Appl. No. 14/185,772, dated Apr. 17, 2015, 6 pgs.
Response to Final Office Action filed Jul. 15, 2015 for U.S. Appl. No. 14/185,772, dated Apr. 17, 2015, 9 pgs.
Non-Final Office Action received for U.S. Appl. No. 14/185,772, dated Jul. 31, 2015, 5 pgs.
Applicant Initiated Interview Summary received for U.S. Appl. No. 14/185,772, dated Oct. 22, 2015, 3 pgs.
Response to Non-Final Office Action filed Nov. 2, 2015 for U.S. Appl. No. 14/185,772, dated Jul. 31, 2015, 10 pgs.
Notice of Allowance received for U.S. Appl. No. 14/185,772, dated Nov. 16, 2015, 5 pgs.
Notice of Allowance received for U.S. Appl. No. 14/185,772, dated Feb. 26, 2016, 3 pgs.
Non-Final Office Action received for U.S. Appl. No. 14/997,421, dated Mar. 22, 2017, 8 pgs.
Applicant Initiated Interview Summary received for U.S. Appl. No. 14/997,421, dated Jun. 14, 2017, 3 pgs.
Response to Non-Final Office Action filed Jun. 19, 2017 for U.S. Appl. No. 14/997,421, dated Mar. 22, 2017, 10 pgs.
Final Office Action received for U.S. Appl. No. 14/997,421, dated Aug. 1, 2017, 6 pgs.
Response to Final Office Action filed Sep. 22, 2017 for U.S. Appl. No. 14/997,421, dated Aug. 1, 2017, 8 pgs.
Notice of Allowance received for U.S. Appl. No. 14/997,421, dated Oct. 2, 2017, 5 pgs.
First Examination Report received for Australian Patent Application No. 2014383030 dated Apr. 21, 2017, 3 pgs.
Response to First Examination Report filed Mar. 26, 2018 for Australian Patent Application No. 2014383030, dated Apr. 21, 2017, 14 pgs.
Office Action received for Canadian Patent Application No. 2,939,233, dated Jun. 13, 2017, 3 pgs.
Response to Office Action filed Dec. 13, 2017 for Canadian Patent Application No. 2,939,233, dated Jun. 13, 2017, 11 pgs.
Voluntary Amendment for Canadian Patent Application No. 2,939,233, filed Jan. 30, 2018, 10 pgs.
International Search Report received for PCT Application No. PCT/US2014/069845, dated Mar. 13, 2015, 2 pgs.
International Written Opinion received for PCT Application No. PCT/US2014/069845, dated Mar. 13, 2015, 4 pgs.
Office Action received for Canadian Patent Application No. 2,939,233, dated Jun. 21, 2018, 3 pgs.
Response to Office Action filed Oct. 30, 2018, for Canadian Patent Application No. 2,939,233, 5 pgs.
Office Action received for Canadian Patent Application No. 2,939,233, dated Apr. 9, 2019, 5 pgs.
First Examination Report received for Australian Patent Application No. 2018202803, dated Jun. 18, 2019, 4 pgs.
Response to Canadian Office Action filed Sep. 12, 2019, for Canadian Patent Application No. 2,939,233 Office Action dated Apr. 9, 2019, 27 pages.

\* cited by examiner

INTERACTIVE VENUE ASSISTANT

CROSS-REFERENCE TO RELATED APPLICATIONS

This application is a continuation of U.S. patent application Ser. No. 14/997,421, filed on Jan. 15, 2016, now U.S. Pat. No. 9,891,056, issued on Feb. 13, 2018; which is a continuation of U.S. patent application Ser. No. 14/185,772, filed on Feb. 20, 2014, now U.S. Pat. No. 9,310,205, issued on Apr. 12, 2015; the disclosures of both of these applications and patents are incorporated by reference herein.

BACKGROUND

Field of the Invention

The present invention generally relates to providing an augmented reality experience and location-based services for a user at an event, such as a sports game, theater event, or concert.

Related Art

An individual attending a real-time event in person may desire information related to the real-time event, such as the services available at the location or venue of the real-time event and any friends that are present at the location of the real-time event. Further, the individual may desire that information in such a way as to augment his or her viewing of the environment at the event. Conventionally, the desired information may be provided in a venue map or guide with details regarding food offerings, merchandise stores, restrooms, and ATM locations. This information, however, is not presented to the user in a useful form, and is not catered to the user's personal choices. Accordingly, it would be beneficial to deliver more personalized information to the user to assist the user at an event and venue.

Figure 1:
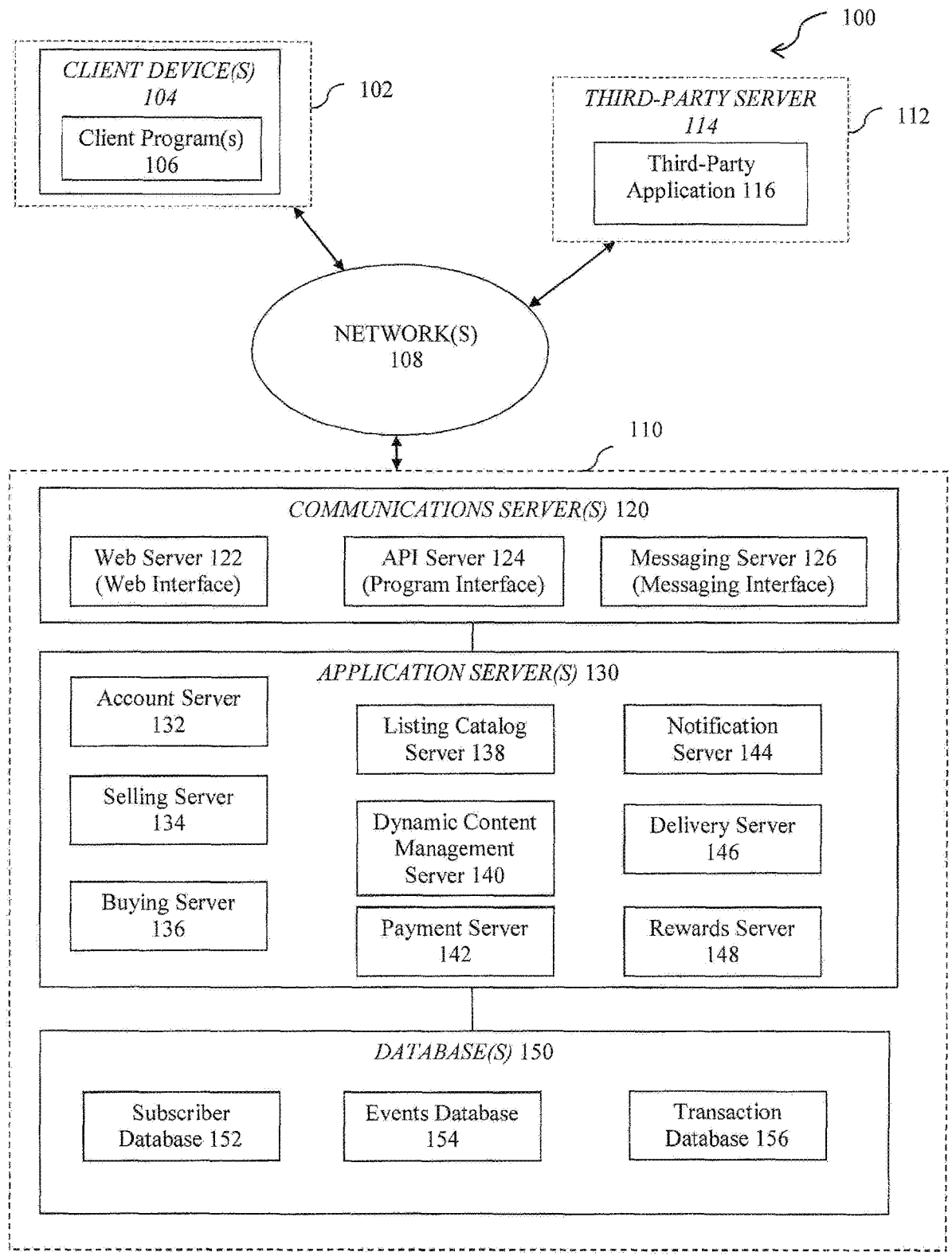
FIG. 1 is a is a block diagram of a networked system suitable for implementing the methods described herein according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes techniques for assisting a user at a venue with an augmented reality environment. Augmented reality provides a user with a live view of a physical, real-world environment, augmented with artificial computer-generated sound, video and/or graphic information. A device typically displays the live view of the physical, real-world environment on a screen or the like, and the artificial, computer-generated information is overlaid on the user's live view of the physical, real-world environment.

Augmented reality can be incorporated and used on smartphones and other user devices. Mobile devices, especially wearable ones that may be in the form of eyewear (e.g., Google Glass®), mobile-enabled wrist watches, or head-mounted displays, are available to provide augmented reality experiences to users. Such devices typically include display technology by which computer information is overlaid on the scene in front of the user.

In an augmented reality environment, relevant information regarding a location, event, and/or venue can be rendered or presented to the user so as to augment the user's view of the location, event, and/or venue. Such information or data can be about a person, place, or object that is in or near a particular geographical location. Further the device can assist the user at the venue by providing information that is relevant to a specific time (e.g., before, during, or after the event). For example, the device may determine that a break or intermission is coming up and recommend a bathroom or snack break to the user.

The present disclosure provides systems and methods that guide or navigate users to points of interest at a venue for an event and/or provide other relevant information. For example, the methods may provide directions to the user, wherein the directions are overlaid on the user's view of the environment. In other examples, the methods and systems help users discover surrounding restaurants, shops, restrooms, and other services and facilities at a venue. In some embodiments, the contacts in the user's social network that are present at the venue can be automatically detected, and the user can share his or her experience and view his or her contacts' experience. In addition, the methods and systems may provide real-time information about the event in the venue and recommend product and/or services with coupons, discounts, or other promotions.

In various embodiments, when a user requests information regarding a specific point of interest, the methods and systems take the information for that point of interest and anticipate what the user may request next. For example, if the user asks the device for a restaurant that is kid-friendly, the device may also display information associated with kid-friendly activities at the venue, such as playgrounds or parks. In another example, if the user has requested a place that serves drinks, the device may note the nearest restroom when the user passes by or when a break is close.

Beginning with FIG. 1, an exemplary embodiment of a computing system adapted for implementing one or more processes involving assisting a user at an event is illustrated in block diagram format. As shown, computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a user 102 that may comprise or employ one or more user devices 104, such as a mobile computing device, a wearable computing device such as a smart watch or smart goggles, a PC, and/or any other computing device having computing and/or communications capabilities in accordance with the described embodiments. User devices 104 generally may provide one or more user programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of user programs 106 may display various graphical user interfaces (GUIs) to present information to and/or receive information from one or more of user devices 104.

User device 104, in one embodiment, includes a geo-location component adapted to monitor and provide an instant geographical location (i.e., geo-location) of the user device 104. In one implementation, the geo-location of the user device 104 may include global positioning system (GPS) coordinates, zip-code information, area-code information, street address information, and/or various other generally known types of geo-location information. In one example, the geo-location information may be directly entered into the user device 104 by a user via a user input component, such as a keyboard, touch display, and/or voice recognition microphone. In another example, the geo-location information may be automatically obtained and/or provided by the user device 104 via an internal or external GPS monitoring component. In other embodiments, the geo-location can be automatically obtained without the use of GPS. In some instances, cell signals or wireless signals are used. This helps to save battery life and to allow for better indoor location where GPS typically does not work.

In one aspect, when interfacing with the user device 104, the user 102 may elect to provide or may be prompted to provide permission for the release of geo-location information. Accordingly, the user 102 may have exclusive authority to allow transmission of geo-location information from the user device 104 to the network-based system 110. In any instance, the network-based system 110 may communicate with the user device 104 via the network 108 and request permission to acquire geo-location information from the user device 104 for geo-location based mobile commerce.

As shown, user 102 can be communicatively coupled via one or more networks 108 to a network-based system 110 managed by an online service provider, such as, for example, StubHub, Inc. of San Francisco, Calif. Network-based system 110 may be structured, arranged, and/or configured to allow user 102 to establish one or more communication sessions with network-based system 110 using various computing devices 104 and/or user programs 106. Accordingly, a communication session between user 102 and network-based system 110 may involve the unidirectional and/or bidirectional exchange of information and may occur over one or more types of networks 108 depending on the mode of communication. While the embodiment of FIG. 1 illustrates a computing system 100 deployed in a user-server operating environment, it is to be understood that other suitable operating environments and/or architectures may be used in accordance with the described embodiments.

Data and/or voice communications between user 102 and the network-based system 110 may be sent and received over one or more networks 108 such as the Internet, a WAN, a WWAN, a WLAN, a mobile telephone network, a landline telephone network, a VoIP network, as well as other suitable networks. For example, user 102 may communicate with network-based system 110 over the Internet or other suitable WAN by sending and or receiving information via interaction with a web site, e-mail, IM session, and/or video messaging session. Any of a wide variety of suitable communication types between user 102 and system 110 can take place, as will be readily appreciated.

In various embodiments, computing system 100 can include, among other elements, a third party 112, which may comprise or employ a third-party server 114 hosting a third-party application 116. In various implementations, third-party server 114 and/or third-party application 116 may host a web site associated with or employed by a third party 112. For example, third-party server 114 and/or third-party application 116 may enable network-based system 110 to provide user 102 with additional services and/or information, such as additional ticket inventory. In some embodiments, one or more of user programs 106 may be used to access network-based system 110 via third party 112. For example, user 102 may use a web user to access and/or receive content from network-based system 110 after initially communicating with a web site of third-party 112.

Network-based system 110 may comprise one or more communication servers 120 to provide suitable interfaces that enable communication using various modes of communication and/or via one or more networks 108. Communication servers 120 can include a web server 122, an API server 124, and/or a messaging server 126 to provide interfaces to one or more application servers 130. Application servers 130 of network-based system 110 may be structured, arranged, and/or configured to provide various online marketplace and/or ticket fulfillment services to users that access network-based system 110. In various embodiments, user 102 may communicate with application servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of user devices 104 and/or user programs 106 and may interoperate with each other in some implementations.

Web server 122 may be arranged to communicate with web users and/or applications such as a web browser, web browser toolbar, desktop widget, mobile widget, web-based application, web-based interpreter, virtual machine, and so forth. API server 124 may be arranged to communicate with various user programs 106 and/or a third-party application 116 comprising an implementation of API for network-based system 110. Messaging server 126 may be arranged to communicate with various messaging users and/or applications such as e-mail, IM, SMS, MMS, telephone, VoIP, video messaging, and so forth, and messaging server 126 may provide a messaging interface to enable access by user 102 and/or third party 112 to the various services and functions provided by application servers 130.

When implemented as an online ticket marketplace, application servers 130 of network-based system 110 may provide various online marketplace and ticket fulfillment services including, for example, account services, buying services, selling services, listing catalog services, dynamic content management services, delivery services, payment services, and notification services. Application servers 130 may include an account server 132, a buying server 134, a selling server 136, a listing catalog server 138, a dynamic content management server 140, a payment server 142, a notification server 144, and/or a delivery server 146 structured and arranged to provide such online marketplace and ticket fulfillment services. Application servers 130 are adapted to receive ticket information associated with an event, provide a user with information on a specific point of interest based on the ticket information, and navigate the user to the specific point of interest. Points of interest include the location of friends and/or family, restaurants, restrooms, and/or attractions at a venue. Based on the points of interest, application servers 130 can propose and recommend user actions at the venue.

Application servers 130 may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
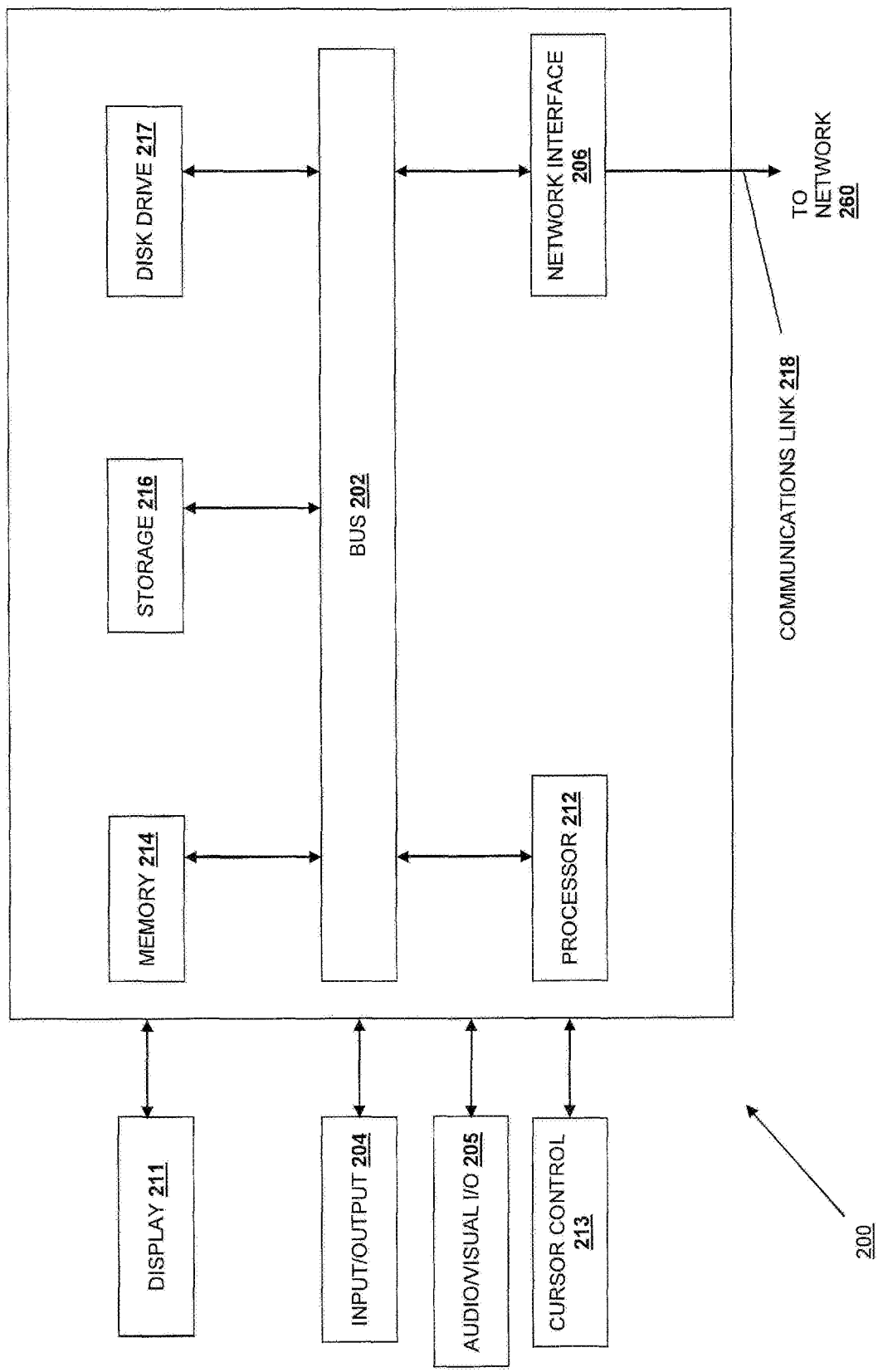
FIG. 2 is a block diagram of a computer system suitable for implementing one or more components in FIG. 1 according to one embodiment of the present disclosure.

Continuing with FIG. 2, an exemplary computer system 200 suitable for implementing one or more devices of the computing system in FIG. 1 is depicted in block diagram format. In various implementations, a device that includes computer system 200 may comprise a personal computing device (e.g., a smartphone, a computing tablet, a personal computer, laptop, PDA, Bluetooth device, key FOB, badge, etc.) that is capable of communicating with a network. The service provider may utilize a network computing device (e.g., a network server) capable of communicating with the network. It should be appreciated that each of the devices utilized by users and service providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, or a payment provider server via a network. In one embodiment, the transmission is wireless, although other transmission mediums and methods may also be suitable. A processor 212, which can be a micro-controller, digital signal processor (DSP), or other processing component, processes these various signals, such as for display on computer system 200 or transmission to other devices over a network 260 via a communication link 218. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Figure 3:
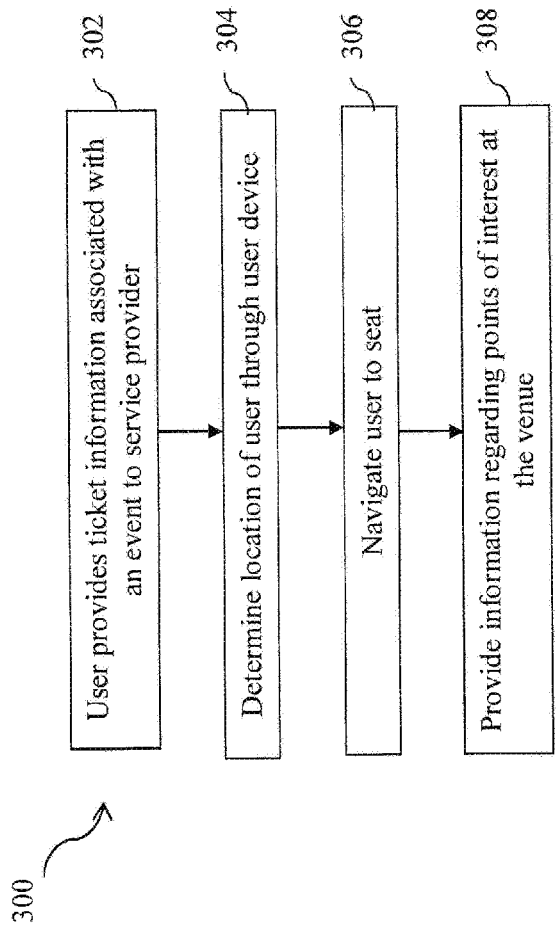
FIG. 3 is a flowchart showing a method of assisting a user at an event according to an embodiment of the present disclosure.

Referring now to FIG. 3, a flowchart of a method 300 for assisting a user at an event is illustrated according to an embodiment of the present disclosure. It should be appreciated that the method illustrated in the embodiment of FIG. 3 may be implemented by the systems illustrated in FIGS. 1 and/or 2 according to one or more embodiments.

The method 300 begins at step 302, where the user 102 provides ticket information associated with an event to a service provider. Ticket information includes, but is not limited to, the event, the venue, the time, artist, duration of the event, seat information (e.g., section, row and number), etc. For example, the user 102 can open up a mobile application or "app" run by the service provider, and choose a specific ticket from a list, or the user 102 may scan a physical ticket to provide the ticket information.

At step 304, the service provider determines a location of the user 102 through the user device 104. The user device 104, in one embodiment, includes a location determination device (e.g., a GPS device, a cell tower triangulation system device, and/or a variety of other location determination devices known in the art) that is operable to determine a current location of user device 104.

The user 102 may release geo-location information to the service provider by, for example, setting release parameters. In one aspect, the user geo-location information includes user information related to a physical location or position of the user device 104, which is passed to the network-based system 110 via the network 108. The user geo-location information may include GPS coordinates (e.g., longitude and latitude) inherent to the user device 104, such as a mobile cellular phone, and/or zip-code information. The user geo-location information may include user identifier information identifying the user 102. The user 102 may manually set geo-location information, such as a zip code and/or longitude and latitude coordinates.

At step 306, the service provider navigates or guides the user 102 to his or her seat. The service provider may have earlier received from the user 102 the user's seating at the venue to use as needed, or may have obtained the user 102's seating by having access to seats purchased by the user 102. In an embodiment, the user 102 requests the service provider, through the mobile application, to take the user 102 to his or her seat. In another embodiment, the application automatically pops up on the user device 104 when the user 102 enters the venue and asks the user 102 if the user wants to be taken to his or her seat.

In one embodiment, the user 102 may use the camera of user device 104 such as an iPhone or an iPad to receive directions. For example, the display of the user device 104 may show arrows or a map to augment the user's view of the venue. In one example, a two-dimensional indoor map of the venue augments the user 102's view of the venue on the user device 104, along with arrows that point in the direction the user 102 should be walking. In still another embodiment, directions may be provided based on the user's preferences previously sent to the system 110. For instance, if the user 102 requires elevators, the directions will point the user 102 in the direction that includes elevators. If the user 102 needs a ramp, the directions point the user 102 to the ramps. Otherwise the mobile application may be free to point out directions using stairs.

In some embodiments, service provider overlays the time left and distance to the seat on the user 102's view. For example, the distance left to get to the seat may be displayed as 150 meters, and the time to get to the seat may be displayed as 2 minutes. As the user 102 gets closer to his or her seat, the time and distance decrease. In various embodiments, the service provider determines the walking speed of the user 102, and employs this information to provide an estimate of how much longer and how much farther it will take for the user 102 to get to his or her seat. In one or more embodiments, a radar map is also overlaid on the user 102's view.

The route or directions for the user 102 to get to the seat may vary depending on different factors, such as time remaining before the event starts, time remaining before doors close, congestion along one or more areas along a potential route, etc. For example, the user 102 may be provided a longer route in terms of distance, but shorter in terms of time required to get to the seat based on the longer route having less congestion along the way, especially if the event is about to start or doors are about to close. If there is plenty of time before the user 102 should be at the seat, the route may provide suggestions for restrooms and/or concession stands that are less congested along the way to the seat. This may prompt the user 102 to go to the restroom and/or make a food/drink purchase because the user 102 is made aware and realizes there is time before the event starts. As such, the route may depend on the user's current location, the location of the seat, time until the event, estimated time for the user to arrive at the seat, and congestion along a route or at restrooms, concession stands, or other areas along a route.

When the service provider detects that the user 102 has arrived at his or her seat, the mobile application may display a message or icon on the user device 104 to remind the user 102 that he or she has arrived at the seat, and prompt the user 102 to take a picture of the view from the seat. The app may then suggest sharing the picture on the user 102's social networks.

At step 308, based on the location (e.g., venue) of the user device 104, the event at the venue, and/or the time, the service provider provides information regarding points of interest at the specific venue. Points of interest include where contacts (e.g., friends or family) are seated or located, food service providers or retail stores, surrounding facilities (e.g., restrooms, ATMs, pay phones, water fountains, etc.), attractions (e.g., displays, shows, presentations, etc.), and landmarks.

In one embodiment, an iPhone or iPad may function as a "set of eyeglasses," providing the user 102 with information relevant to the user's personal choices as the user 102 moves the user device 104 from place to place within the venue. For instance, as the user 102 walks out of the user's seating section, the user device 104 may show the location of places that the user 102 may be interested in, for example the closest bathroom, the bathroom with the shortest lines that is still nearby the user, or a bathroom that is outfitted for the handicapped, and guide the user 102 to the place(s). The guidance or route may depend on factors, such as described earlier. For example, if the event is still going on (e.g., not during an intermission or stoppage of play), the user 102 may be directed to locations that will enable the user 102 to get back to the seat as soon as possible, such as restrooms and/or concession stands that may be a bit farther, but have much shorter lines or no lines. If the user 102 is leaving during an intermission or stoppage of play, the system may estimate how long before the event resumes in order to provide a more intelligent route. For example, if the user 102 is leaving at the start of halftime of a football game, the user 102 may be provided a route that is not as time sensitive as if the user 102 is leaving a baseball game between innings. This can be done by the camera of the user device 104.

The user 102 can configure the app to provide information based on previously provided information regarding the user 102 and specific points of interest. For example, the user 102 may indicate whether there are any infants, children, disabled, or elderly people in the party. The user 102 may also have input specific points of interest before entering the venue, such as type and location of a restaurant (e.g., kid-friendly, handicap accessible, etc.), bathrooms, handicapped bathrooms, an exit closest to where the user 102 is parked, and the like. The user 102 may then send the system 110 a request for the desired information to augment the reality of his or her view of the venue.

In another embodiment, the user 102 can request the information in real-time. For example, as the user 102 walks away from his or her seat and towards concessions or restrooms, the user 102 can request general information (e.g., "Let me see all the restrooms" or "Let me see all the restaurants"), or specific information ("Notify me when I am within 100 meters of a place that sells food"). In response to the general request, the service provider can display a list of restrooms at the venue, their distance from the user 102, and whether they are busy or vacant. The service provider can also display a list of food service providers at the venue, their distance from the user 102, and any promotions (e.g., coupons, deals, sales, etc.) associated with the food service provider. In an embodiment, the information is arranged and displayed based on the distance from the user 102.

In one embodiment, the service provider provides information to the user 102 based on the user 102's position in the venue. For example, as the user 102 walks by a restaurant within the venue, a message relating to the restaurant can be presented on the user device 104, including any related advertising.

Other embodiments may include the user 102 requesting the service provider to display the shortest path out of the venue to where the user 102 parked his or her car. The service provider may receive a feed of road traffic, and the user 102 could request the parking lot exit from which to leave in order to encounter the least traffic, the fastest way home, or the route that has the least traffic, or the route that passes a particular restaurant, or that passes several restaurants on the way home, and the service provider could respond with that information for display on the user device 104.

Another embodiment may show the user 102, for example by arrows, where friends of the user 102 are seated in the stands of the venue, and show the distance to the friends' seats. This may be implemented, as one example, by the user 102 sending the service provider a query for the seat location of a friend. Responsive to this query, the service provider may read the friend's phone number from the user's cell phone contact list and, in conjunction with a GPS satellite system, determine the seat location, generally or specifically, of the cell phone that has the friend's phone number. The service provider may then respond to the user 102 with information as to the friend's seat location, including, if desired, placing an arrow on the display of the user device 104 pointing to the location of the friend's seat, augmenting the viewer's personal reality of viewing the venue live.

In an alternate embodiment, instead of GPS technology, the service provider may have stored in its database the names of people who purchased the various seats for the event, and may then, upon request for the seating of a particular person, search for the name of that person to find the person's seat location. Again, if desired, an arrow pointing to the seat location may be placed upon the image of the user device 104 in order to augment the reality of the live viewing of the venue.

In yet another embodiment, the friend may have posted on a social network such as Facebook the section, row, and seat number where that friend will be sitting. The user 102 may then read this seating off the friend's Facebook wall and send that information to the service provider, for use by the service provider in augmenting the user device 104 by, as one example, pointing on the device's display to the point in the venue where that seating is located.

Advantageously, the app can determine what information to provide and display to the user 102, based not only on the venue and event, but also on the time. Because the service provider knows what event the user 102 is at, the service provider understands event timing (e.g., before the event, during the event, intermission/interlude/interval, after the event, etc.). Because the service provider knows what venue the user 102 is located in, the service provider knows what services and products are available to the user 102. Combining knowledge of the particular venue, event, and time, the app can recommend or push information relevant to the user 102 for that specific time, specific event, and specific location.

For example, assume the user 102 requests the app to find a place to grab a snack during a concert. The app determines the time of the request (e.g., during the concert), and because most concert-goers are enjoying the concert and not buying food, the app directs and navigates the user 102 to the closest concession stand. In another embodiment, the user 102 requests the app to find a place to eat, but the request is received during intermission in the concert. In this case, the app may direct the user 102 away from food services that are closest to the seats, away from the crowds.

In various embodiments, the app determines the current time and pushes notifications and/or advertisements to the user 102. The app can guess what the user 102 can do at a certain time and provide promotions that are relevant for that time. For example, the app determines that the user 102 has free time because there is an intermission. The app can present opportunities to fill the time, such as shopping, dining, visiting the restroom, making a call, etc. The app can also provide promotions that can be used during that time (e.g., 20% discount on hot dogs before the start of the third basketball quarter). In another example, the user 102 is a big fan of a sports team, the game has not started yet, and the user 102 is passing by a souvenir shop so the app proposes that the user 102 stop and spend some time browsing in the shop.

In other embodiments, the app can guess what the user 102 wants to do, based on information it has received from the user 102 at the venue. For example, suppose that the user 102 has requested a place that provides drinks a few times, and the user 102 has purchased a couple of sodas. The app can suggest the nearest restroom when the user 102 passes by, or when a break or intermission is close.

The app can further provide real-time event information and updates to the user 102, such as sports scores. In the specific example of a car racing event, the real-time information can include: the current ranking; number of laps remaining; participants still in the race; participants no longer in the race; fastest lap of the current leader or of anyone of the participants; average speed of the current leader or of anyone of the participants, among others; present speed of anyone of the participants; and Revolutions Per Minute (RPM) of the engine of anyone of the participants.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system comprising:
   a display;
   a camera;
   one or more memory devices or storage components configured to store machine-readable instructions; and
   one or more processors in communication with the display, the camera, and the one or more memory devices or storage components, the one or more processors configured to execute the machine-readable instructions to perform or to control performance of operations, the operations comprising:
   determine a location of the system;
   determine that the system has arrived at a venue associated with a point of interest based on the location of the system;
   in response to the determination that the system arrived at the venue, capture an image of surroundings of the system using the camera and overlay the image of the surroundings of the system with information regarding the point of interest, the information based on the location of the system; and
   cause the display to present the overlaid image.

2. The system of claim 1, wherein the operations further comprise cause the display to present directions to a seat location at the venue.

3. The system of claim 1, wherein:
   the point of interest includes a location of a friend or family member of a user of the system at the venue, a retail store in the venue, a food service provider in the venue, a restaurant in the venue, a restroom in the venue, an automated teller machine (ATM) in the venue, a water fountain in the venue, a landmark in the venue, an attraction at the venue, or a location of a parked car of the user; and
   the information overlaying the surroundings includes an image associated with the point of interest.

4. The system of claim 1, wherein the operations further comprise determine a current time.

5. The system of claim 4, wherein the operations further comprise recommend a user action based on the current time, a schedule of an event at the venue, and the venue.

6. The system of claim 5, wherein the information includes directions to the point of interest.

7. The system of claim 1, wherein the operations further comprise cause the display to present a seat location at the venue of a friend of a user of the system.

8. The system of claim 1, wherein the operations further comprise receive a request, from a user of the system, for information regarding a second point of interest.

9. The system of claim 8, wherein the operations further comprise, based on the request, anticipate a further request from the user.

10. A method comprising:
    determining a location of a user device by one or more processors of the user device;
    determining, by the one or more processors of the user device, that the user device has arrived at a venue associated with a point of interest based on the location of the user device;
    in response to the determination that the user device arrived at the venue, capturing an image of surroundings of the user device using a camera of the user device and overlaying the image of the surroundings of the user device with information regarding the point of interest, the information based on the location of the user device and including directions to the point of interest; and
    causing, by the one or more processors of the user device, the overlaid image to be presented on a display of the user device.

11. The method of claim 10, wherein the directions to the point of interest are based on a current location of the user device, a seat location in the venue of a user operating the user device, time to start of an event at the venue, estimated time to the point of interest, congestion along a route to the point of interest, or a combination thereof.

12. The method of claim 10, further comprising determining a walking distance to the point of interest.

13. The method of claim 12, further comprising presenting on the display of the user device, the walking distance and time left to walk to the point of interest.

14. The method of claim 10, further comprising obtaining, by the user device, real-time event information.

15. The method of claim 10, further comprising determining a current time.

16. The method of claim 15, further comprising recommending a user action based on the current time, a schedule of an event at the venue, and the venue.

17. A non-transitory machine-readable medium comprising a plurality of machine-readable instructions which, when executed by one or more processors, are configured to cause a system to perform operations, the operations comprising:
    determining a location of a user device;
    determining that the user device has arrived at a venue associated with a point of interest based on the location of the user device;
    in response to the determination that the user device arrived at the venue, capturing, using a camera of the user device, an image of surroundings of the user device and overlaying the image of the surroundings of the user device with information regarding the point of interest, the information based on the location of the user device and including directions to the point of interest; and
    causing, by the one or more processors, the overlaid image to be presented on a display of the user device.

18. The non-transitory machine-readable medium of claim 17, wherein the point of interest includes a location of a friend or family member of a user of the system at the venue, a retail store in the venue, a food service provider in the venue, a restaurant in the venue, a restroom in the venue, an automated teller machine (ATM) in the venue, a water fountain in the venue, a landmark in the venue, an attraction at the venue, or a location of a parked car of the user.

19. The non-transitory machine-readable medium of claim 17, wherein the operations further comprise:
   determine a walking distance to the point of interest based on the location of the user device; and
   overlay on the image of the surroundings the walking distance and a time left to walk to the point of interest.

20. The non-transitory machine-readable medium of claim 19, wherein the operations further comprise overlaying on the image of the surroundings a recommendation of products, services, or both, that are associated with coupons, discounts, or other promotions.

* * * * *